United States Patent [19]

Shaffer

[11] 4,047,724
[45] Sept. 13, 1977

[54] COLLAPSIBLE UTILITY CART

[76] Inventor: Robert H. Shaffer, 316 Escuela - No. 10, Mountain View, Calif. 94040

[21] Appl. No.: 666,555

[22] Filed: Mar. 15, 1976

[51] Int. Cl.² .................................................. B62B 1/08
[52] U.S. Cl. .................................. 280/5.22; 280/47.2
[58] Field of Search .................. 280/5.22, 5.2, 5.24, 280/5.26, 5.28, 5.3, 5.32, 47.2, 461; 180/8 A

[56] References Cited

U.S. PATENT DOCUMENTS

| | | | |
|---|---|---|---|
| 2,132,069 | 10/1938 | Hall | 280/5.22 |
| 2,715,533 | 8/1955 | Strausburg | 280/5.22 |
| 3,515,401 | 6/1970 | Gross | 280/5.26 |

*Primary Examiner*—Joseph F. Peters, Jr.
*Assistant Examiner*—John A. Pekar
*Attorney, Agent, or Firm*—Townsend and Townsend

[57] ABSTRACT

An improved cart capable of being readily collapsed for storage and having front wheel means and a pair of spaced stair-climbing assemblies for moving the cart over a surface and for allowing the cart to move up or down a flight of stairs. The cart has a normally inclined main frame to which one or more open top wire baskets can be coupled by hooks thereon. Rear support structure for the main frame includes a pair of normally inclined, rearwardly extending rods pivotally mounted at their upper ends to the main frame and having articulated links to keep the main frame and the rods normally apart but which allow the rods to collapse and to move into positions near and extending along the main frame. The stair-climbing assemblies are pivotally mounted on the lower ends of the rods and respective links which normally hold the upper ends of the assemblies spaced from the rods yet permit the assemblies to collapse to positions extending along and adjacent to the rods. In its collapsed state, the cart is compact in size and easily carried or stored with or without the baskets mounted on the hooks of the main frame.

12 Claims, 4 Drawing Figures

COLLAPSIBLE UTILITY CART

This invention relates to improvements in the construction of push carts and, more particularly, to a utility cart having a stair-climbing capability as well as removable baskets for ease in loading the cart.

BACKGROUND OF THE INVENTION

Push carts of different designs are well-known. Even carts or trucks with stair-climbing assemblies have been used in the past. Typical of these carts are those disclosed in the following U.S. Pat. Nos. 2,132,069; 2,715,533; 2,736,564; 2,770,310; 2,793,868; 3,370,664; and 3,420,540. All of these references disclose structures which are quite complex in construction and have limited use beyond climbing of stairs. Moreover, because they are complex, they require considerable effort to maneuver and to handle. None of these patents shows or suggests a utility cart of simple and rugged construction suitable for home or other use which is not only collapsible to a compact shape but has removable baskets in addition to a stair-climbing capability. A need exists for such a cart because of the many household and other chores that can readily be carried out but are left undone or are done hapharzardly because of the lack of a simple utility cart to ease the burden of performing such chores.

SUMMARY OF THE INVENTION

The present invention satisfies this need by providing a wheeled utility cart which is lightweight in construction, can be readily collapsed or expanded into an operative condition, has removable baskets which are easily placed on and taken off the cart, and has a pair of stair-climbing assemblies to permit the cart not only to move over flat surfaces but to be used for carrying loads up and down a flight of stairs, all with a minimum of effort while fully protecting the load carried by the baskets on the cart.

To this end, the cart is comprised of a normally inclined front or main frame having hooks which are used to impale one or more open top wire baskets which, when impaled on the hooks, rest on the inclined front face of the main frame. A pair of rearwardly extending, inclined rods or legs support the main frame and have wheels at their lower ends cooperating with casters on the lower ends of the main frame. The lower wheels of the rear legs form parts of the stair-climbing assemblies, the latter further including endless, flexible belts supported by small rollers carried by rigid supporting plates immediately forwardly of the rear stretch of each of the belts. Articulated linkages releasably hold the rear legs and the stair-climbing assemblies in expanded, operative positions, yet the linkages allow the legs and assemblies to move into collapsed positions in proximity with the main frame to form a compact shape capable of easily being stored in a minimum of space. The linkages are of the over-center type to thereby eliminate the need for locks and other structure to hold the various elements of the cart in their operative positions.

The various parts of the cart can be made of relatively lightweight material, such as aluminum or the like. Thus, the cart is not only easy to maneuver regardless of whether its going over a flat surface or up or down a flight of stairs, but also the cart, in its collapsed condition, can be easily lifted and, for instance, placed in a car or hung on a wall for storage purposes. The removability of the baskets thereof permits the baskets to be taken off the cart and loaded or filled with articles, then placed back on the cart; thus, the cart with its removable baskets is more adapted to a wider variety of uses than are conventional carts of this type.

The primary object of this invention is to provide an improved wheeled utility cart which is simple and rugged in construction, is lightweight, has removable baskets thereon, and has stair-climbing capabilities yet the cart can be readily collapsed and stored in a compact condition, all of which can be accomplished by a single person with a minimum of effort.

Another object of this invention is to provide a cart of the type described wherein the cart has an inclined front or main frame and a rear support including certain wheels of a pair of stair-climbing assemblies thereof, wherein the rear support is pivotally mounted on the main frame and the stair-climbing assemblies are pivotally mounted on the rear support so that the cart can be readily collapsed for storage without disassembling the various parts thereof from each other.

Other objects of this invention will become apparent as the following specification progresses, reference being had to the accompanying drawings for an illustration of one embodiment of the invention.

IN THE DRAWINGS

Figure 1:
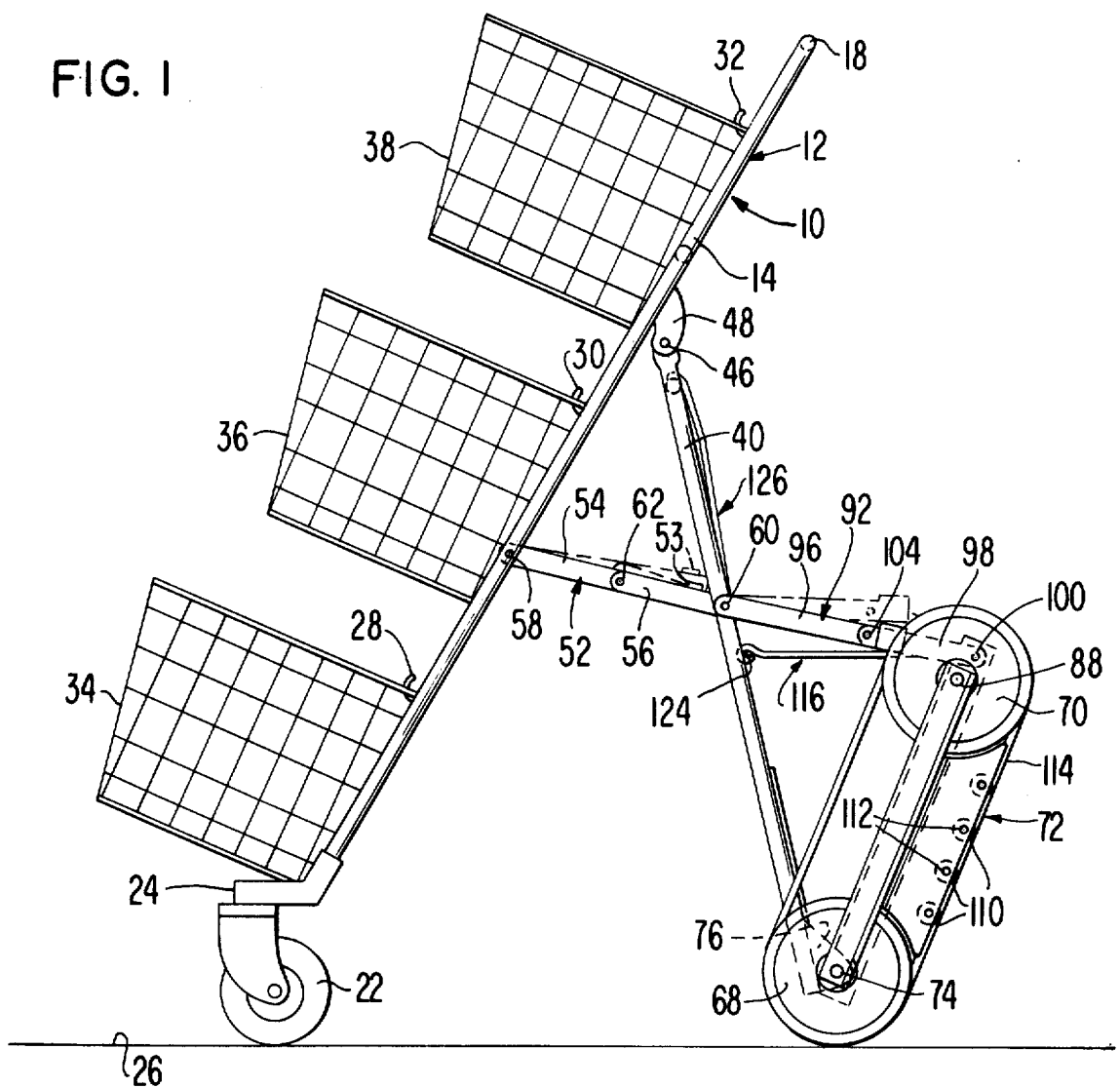
FIG. 1 is a side elevational view of the collapsible utility cart with removable baskets of this invention, certain parts being shown in dashed lines to illustrate the way in which the collapse of the cart is started.
Figure 2:
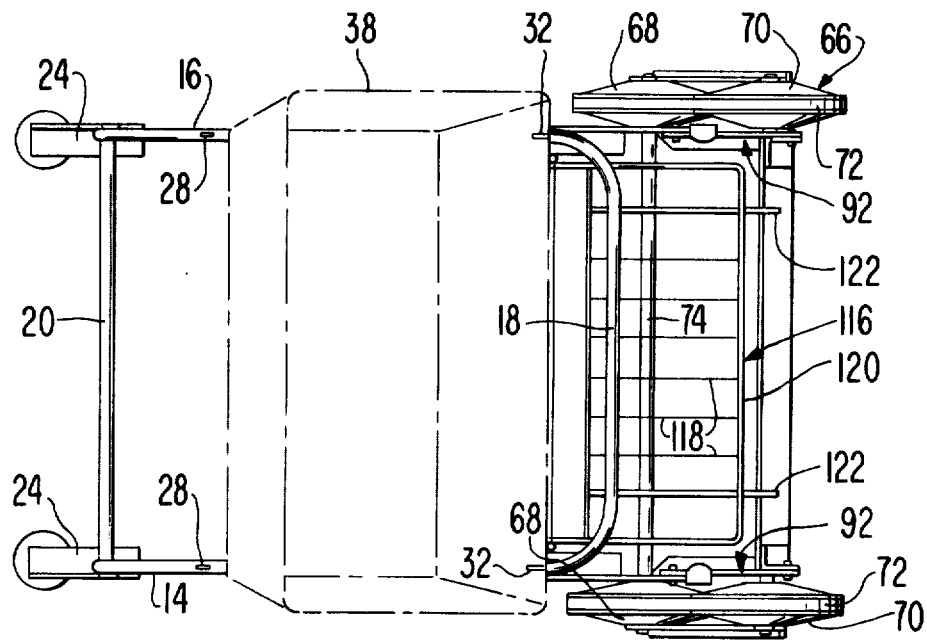
FIG. 2 is a top plan view of the cart.

The utility cart which is the subject of this invention is broadly denoted by the numeral 10 and includes a normally inclined main frame 12 at the front of the cart, the frame 12 being formed by a pair of spaced, generally parallel side rods 14 and 16, a top handle rod or member 18 connecting the upper ends of rods 14 and 16, and a bottom generally straight rod 20 interconnecting the lower ends of rods 14 and 16. A pair of pivotal casters 22, only one of which is shown in FIG. 1 are secured by brackets 24 to the ends of rod 20 as shown in FIG. 2. Casters 22 pivot in 360° arcs about vertical axes when they engage a surface 26 over which cart 10 is to be moved.

Rods 14 and 16 have three sets of basket mounting hooks 28, 30 and 32 thereon as shown in FIG. 1. These hooks are adapted to be received through the framework of respective open wire baskets 34, 36 and 38, the hooks being the only means for connecting the baskets to frame 12 inasmuch as the baskets rest on the inclined front faces of rods 14 and 16 while being impaled on hooks 28, 30 and 32, respectively. In this way, the baskets will remain releasably secured to the frame and the open tops of the baskets will at all times face upwardly so long as the baskets are mounted on the hooks.

Figure 3:
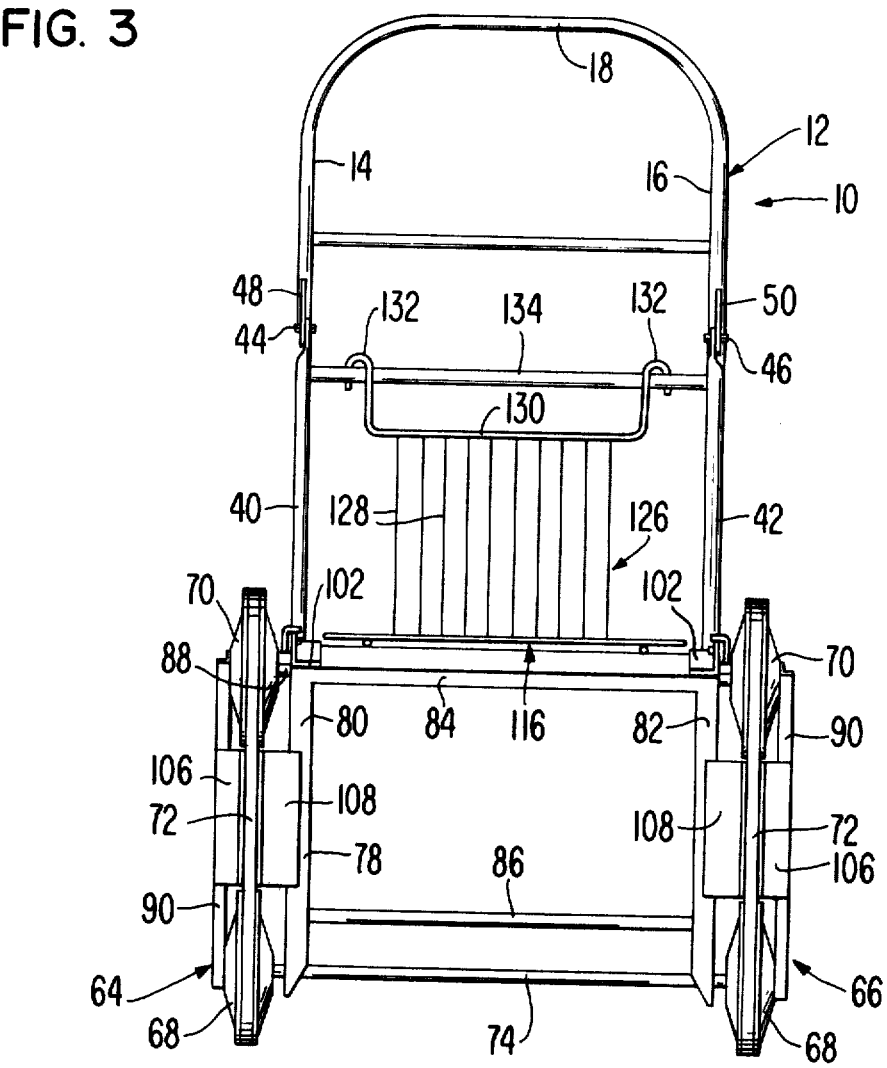
FIG. 3 is a rear elevational view of the cart.

Main frame 12 is supported by rear structure comprised of a pair of generally spaced, parallel rear rods 40 and 42 which are pivotally mounted at their upper ends on respective rods 14 and 16 by means of pins 44 and 46 on rearwardly projecting ears 48 and 50 secured to the rear faces of rods 14 and 16 as shown in FIGS. 1 and 3.

Rods 40 and 42 have respective articulated links 52 which span the distance between intermediate locations on rods 40 and 42 and intermediate locations on respective rods 14 and 16. Only one link 52 is shown in FIG. 1. Each link 52 is comprised of two sections 54 and 56, section 54 being pivotally mounted to the corresponding rod 14 or 16 of frame 12 by a pin 58 and section 56 being pivotally mounted to the corresponding rod 40 or 42 by a pin 60. A pin 62 pivotly interconnects the adjacent ends of sections 54 and 56. Links 52 permit rods 40 and 42 to be inclined and to extend downwardly and away from main frame 12 as shown in FIG. 1 to form a substantially A-frame configuration with main frame 12. Links 52 are adapted to be used in an over-center fashion with an overlapping segment 53 to prevent collapse of the cart until the links are lifted at least to the dashed line position of FIG. 1.

Figure 4:
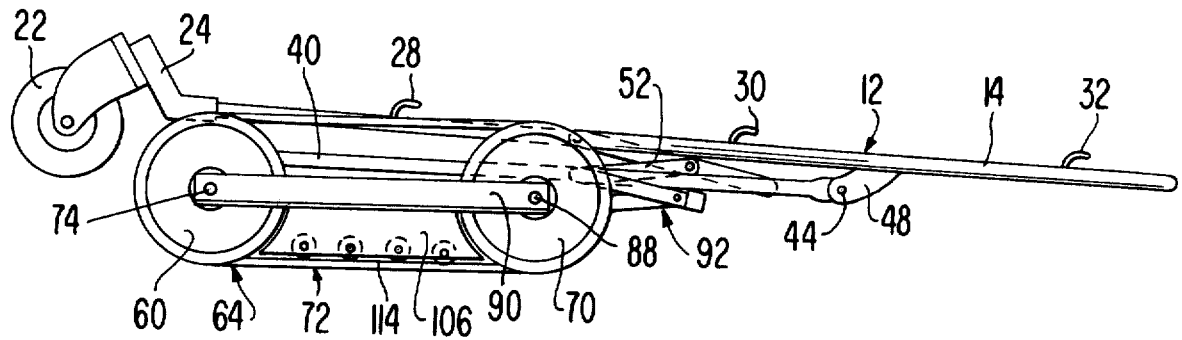
FIG. 4 is a side elevational view of the cart when the same is in its collapsed condition and with the baskets thereof removed therefrom.

Links 52, when collapsed, allow rods 40 and 42 to move into positions directly behind, adjacent to and generally parallel with rods 14 and 16, respectively, as shown in FIG. 4, when it is desired to collapse the cart. The dashed line positions of sections 54 and 56 in FIG. 1 indicate the way in which the collapse of the cart is initiated so as to allow rods 40 and 42 to move forwardly and into proximity to the rear portions of rods 14 and 16 of main frame 12.

Stair-climbing structure for the rear of cart 10 includes two assemblies 64 and 66 of substantially the same construction. Each assembly includes a pair of vertically spaced wheels 68 and 70 having outer peripheral channels and an endless, flexible V-belt 72 coupled with the wheels in the channels thereof as shown in FIGS. 1 and 3. The lower wheels 68 are adapted to engage and move over surface 26. These lower wheels are carried at the outer ends of a shaft 74 mounted on the lower extremities 76 of a frame 78 having a pair of spaced sides 80 and 82 and an upper cross piece or member 84 interconnecting the upper ends of sides 80 and 82. A cross brace 86 interconnects sides 80 and 82 slightly above lower ends 76 as shown in FIG. 3. The upper wheels 70 are carried at the ends of a shaft 88 secured in any suitable manner to upper member 84.

Wheels 68 and 70 of each of assemblies 64 and 66 have a rigid bar 90 extending between the axes thereof and connected to the ends of shafts 74 and 88, respectively, to rigidify the corresponding assembly. The wheels rotate on shafts 74 and 88 and thereby move belt 72 relative to frame 78.

A pair of articulated links 92 and 94 are provided to interconnect opposed ends of cross member 84 to rods 40 and 42, respectively. To this end, each of links 92 and 94 includes a first section 96 pivotally connected to the corresponding pin 60 on the adjacent rod 40 or 42, and a second section 98 pivotally connected by a pin 100 to a bracket 102 (FIG. 3) on the corresponding end of member 84. A pin 104 (FIG. 1) pivotally interconnects sections 96 and 98. The dashed line position of link 92 in FIG. 1 illustrates the way in which the collapse of the stair-climbing structure is commenced when the cart is to be moved into the storage or collapsed condition of FIG. 4. The links are adapted to be used in an over-center fashion when the links are in their full line position of FIG. 1, to thereby releasably hold the stair-climbing structure in its operative position as shown in FIG. 1.

A pair of spaced plates 106 and 108 (FIG. 3) are provided for each assembly 64 and 66, respectively. Plate 106 is welded or otherwise rigidly secured to the lower edge of the corresponding bar 90 and extends rearwardly thereof as shown in FIG. 1. Plate 108 is rigidly secured to the corresponding side of frame 78. Plates 106 and 108 have a plurality of small rollers 110 disposed therebetween and mounted on generally horizontal pins 112 as shown in FIG. 1. Rollers 110 are adapted to engage and to provide a backing support for the vertical stretch 114 of the corresponding belt 72 to support the stretch as the cart is moved upwardly or downwardly on stairs and as stretch 114 engages the stairs.

An accessory to the cart includes a wire seat broadly denoted by the numeral 116 and illustrated in FIG. 2. The seat is made of rigid wires 118 having a rear cross piece 120 provided with extensions 122 which merely rest on cross member 84. The front portion of seat 116 is pivotally mounted on a lower cross wire 124 (FIG. 1) of a back 126 (FIG. 3) comprised of upright rigid wires 128 having an upper cross piece 130 provided with hooks 132 pivotally received within a rigid cross piece 134.

In use, assuming that the cart is in the operative position of FIG. 1, baskets 34, 36 and 38 can be removed from the cart, filled with certain contents such as groceries and the like, then returned and placed on hooks 28, 30, 32 so that the baskets are properly carried on the cart as shown in FIG. 1. The user can then push the cart forwardly and when he reaches a flight of stairs, he backs the cart up to the stairs, then pulls upwardly on the handle member 18, causing stretches 114 of belts 72 to engage the stairs. As the user pulls upwardly on the cart, belts 72 move relative to the cart since the belts stay in engagement with the stairs. This assists in moving the cart over the stairs and as it reaches the top of the stairs casters 22 and lower wheels 68 again engage the surface and the cart can then be pushed over the surface to a terminal point. The same action occurs when the cart is descending the stairs.

When it is desired to collapse the cart, links 52 are slightly pushed upwardly so that they break in the manner shown in dashed lines in FIG. 1. This will cause rods 14 and 42 to move forwardly and adjacent to main frame 12. When this occurs, links 92 can be broken as shown in the dashed lines of FIG. 1 so that the stair-climbing wheel assemblies can be moved so that bars 90 are generally parallel with rods 40 and 42. In this collapsed condition, the cart is very compact as shown in FIG. 4 and generally, the baskets will be removed from the cart and hung up in locations while the cart itself can be hung from a hook on the wall.

I claim:

1. A utility cart comprising: an elongated frame having a normally upper end and a normally lower end; rod means pivotally mounted on the frame intermediate the ends of the frame for mounting the same in an inclined position with reference to a support surface therebelow when said rod means is in an operative position, said rod means having a normally lower extremity and being movable relative to said frame from said operative position to a collapsed position adjacent thereto; a first pair of surface-engaging wheels mounted on the normally lower end of said frame; a pair of elongated stair-climbing assemblies for said rod means, said assemblies including a second pair of surface-engaging wheels adjacent to the lower extremity of said rod means, said assemblies being pivotally mounted on the lower extremity of said rod means and movable relative thereto from respective operative positions extending upwardly and away from said rod means to collapsed positions extending adjacent to and along said rod means; means holding said rod means and said assemblies in respective operative positions; and means on said frame for removably mounting at least one basket thereon.

2. A cart as set forth in claim 1, wherein said frame includes a pair of spaced rods, said basket mounting means including a hook for each rod, respectively.

3. A cart as set forth in claim 1, wherein said holding means includes an articulated linkage, each linkage having a pair of relatively shiftable, pivotally interconnected sections.

4. A cart as set forth in claim 1, wherein each assembly includes additional wheel spaced from the surface-engaging wheels, and an endless, flexible belt coupled to and spanning the distance between the wheels, said belt adapted to engage a flight of stairs as the cart moves up or down the same.

5. A cart as set forth in claim 4, wherein said holding means includes an articulated linkage for each assembly, respectively, each linkage spanning the distance between the rod means and the corresponding assembly near the additional wheel thereof.

6. A cart as set forth in claim 5, wherein each linkage is movable into an over-center condition as the corresponding assembly moves into its operative position.

7. A cart as set forth in claim 4, wherein is included backing structure for one stretch of the belts of each assembly for supporting the stretch as the belt engages and moves up or down a flight of stairs.

8. A cart as set forth in claim 1, wherein the first pair of wheels includes a pair of pivotally mounted casters, each assembly including a pair of vertically spaced wheels, the lower wheels of the assemblies cooperating with the casters for supporting the frame and the rod means on the surface over which said frame is to be moved.

9. A cart as set forth in claim 1, wherein is included an open top wire basket, said mounting means including a pair of hooks on the forward portion of the frame, said basket adapted to be removably mounted on the hooks.

10. A cart as set forth in claim 1, wherein said holding means includes an articulated linkage pivotally coupled with and extending between said frame and said rod means intermediate the ends of the latter.

11. A cart as set forth in claim 10, wherein the linkage is movable into an over-center condition as the rod means moves into its operative position.

12. A utility cart comprising: a main frame having a first pair of spaced rods and a pair of casters pivotally mounted on the lower ends of respective rods; a second pair of spaced rods; there being a second rod for each first rod, respectively, each second rod being pivotally mounted at one end thereof on the respective first rod intermediate the ends thereof; a pair of first articulated linkages, there being a first linkage for each second rod, respectively, each first linkage being coupled to and extending between the respective first and second rods and permitting the corresponding second rod to move from an inclined operative position extending downwardly and away from the respective first rod to a collapsed position extending along and adjacent to the respective first rod, said main frame being normally inclined when said first rods are in said operative positions; a pair of stair-climbing assemblies, each assembly including a pair of spaced, rotatable wheels and an endless, flexible, stair-engageable belt spanning the distance between and coupled to said wheels; a shaft spanning the distance between the lower ends of said second rods and pivotally coupling the assemblies thereto for movement from operative positions extending rearwardly and away from the lower ends of said second rods to collapsed positions extending along and adjacent to said second rods; a pair of second articulated linkages, there being a second linkage for each assembly, respectively, each second linkage being coupled to and extending between the respective second rod and assembly and permitting the assembly to move between its operative and collapsed positions, said first and second linkages being in over-center conditions when the second rods and the assemblies, respectively, are in their operative positions; a number of baskets; and hook means on said first rods for removably mounting the baskets thereon with each basket spanning the distance between said first rods.

* * * * *